(12) United States Patent
Tüshaus et al.

(10) Patent No.: US 7,931,255 B2
(45) Date of Patent: Apr. 26, 2011

(54) FABRIC PACKING

(75) Inventors: Rüdiger Tüshaus, Dorsten (DE); Peter Rössler, Hamm (DE); Michael Jödecke, Bobenheim-Roxheim (DE); Thorsten Friese, Mannheim (DE)

(73) Assignees: T & R Engineering GmbH, Dorsten (DE); BASF Aktiengesellschaft, Ludwigshafen (DE)

( * ) Notice: Subject to any disclaimer, the term of this patent is extended or adjusted under 35 U.S.C. 154(b) by 1078 days.

(21) Appl. No.: 11/685,613

(22) Filed: Mar. 13, 2007

(65) Prior Publication Data

US 2007/0216044 A1 Sep. 20, 2007

(30) Foreign Application Priority Data

Mar. 15, 2006 (EP) ..................... 06005263

(51) Int. Cl.
*B01F 3/04* (2006.01)

(52) U.S. Cl. . 261/94; 261/103; 261/112.1; 261/DIG. 72

(58) Field of Classification Search .............. 261/94, 261/95, 97, 100, 101, 103, 106, 112.1, DIG. 72
See application file for complete search history.

(56) References Cited

U.S. PATENT DOCUMENTS

| | | | | | |
|---|---|---|---|---|---|
| 2,917,292 | A | * | 12/1959 | Hittrich | 261/7 |
| 3,463,222 | A | * | 8/1969 | Grames | 165/10 |
| 3,687,818 | A | * | 8/1972 | Porter et al. | 202/158 |
| 4,022,596 | A | * | 5/1977 | Pedersen | 55/528 |
| 4,374,542 | A | * | 2/1983 | Bradley | 165/166 |
| 4,673,538 | A | * | 6/1987 | Klauss et al. | 261/112.1 |
| 4,800,047 | A | * | 1/1989 | Monjoie | 261/112.2 |
| 5,607,743 | A | | 3/1997 | Disselbeck | |
| 6,221,463 | B1 | * | 4/2001 | White | 428/174 |
| 6,460,832 | B1 | * | 10/2002 | Mockry et al. | 261/112.1 |
| 6,886,816 | B2 | * | 5/2005 | Smith et al. | 261/112.1 |
| 7,491,325 | B2 | * | 2/2009 | Kulick et al. | 210/150 |

FOREIGN PATENT DOCUMENTS

| | | |
|---|---|---|
| DE | 3222892 A1 | 12/1983 |
| EP | 0401580 A | 12/1990 |
| EP | 0416649 A | 3/1991 |
| EP | 1033168 A | 9/2000 |
| JP | 09177725 A | 7/1997 |

* cited by examiner

*Primary Examiner* — Scott Bushey
(74) *Attorney, Agent, or Firm* — Henry M. Feiereisen; Ursula B. Day

(57) ABSTRACT

A fabric packing has a plurality of layers made of a filament of metal or plastic and includes bulges for maintaining the fabric layers at a distance. The bulges have first protuberances of generally trough-shaped configuration and second protuberances formed on the first protuberances, thereby defining respective apexes. The second protuberances are sized smaller than the first protuberances, wherein neighboring fabric layers are supported on one another via the second protuberances.

35 Claims, 2 Drawing Sheets

FABRIC PACKING

CROSS-REFERENCES TO RELATED APPLICATIONS

This application claims the priority of European Patent Application, Serial No. 06 005 263.6, filed Mar. 15, 2006, pursuant to 35 U.S.C. 119(a)-(d), the content of which is incorporated herein by reference in its entirety as if fully set forth herein.

BACKGROUND OF THE INVENTION

The present invention relates, in general, to a fabric packing, and in particular to a wire cloth packing for a vapor-liquid countercurrent column.

Nothing in the following discussion of the state of the art is to be construed as an admission of prior art.

Packed columns are widely used in distillative separation technology, involving a flow of a liquid phase and a vapor phase in opposite directions which are brought into intimate contact to realize a mass transfer between both phases. Mass transfer devices are referred to, e.g., as distillation columns or rectification columns. Mass transfer between liquid and vapor takes place at the interface of both phases. In order to establish and maximize the interface, separating internals are mounted in the distillation columns, like, e.g. mass transfer trays, random packing material, or orderly packings. Orderly packings are hereby understood as geometric arrangements of formed sheet metal layers or fabric layers which are fixedly secured in the mass transfer apparatus. The packings exhibit a large and specific mass transfer surface and a low pressure loss at the same time. The geometry of the packing allows that the specific mass transfer surface and the pressure loss of the packing can be tailored in a desired fashion and suited to the desired separation task.

Fabric packings have been made commercially available by various companies such as Sulzer, Montz or Koch-Glitsch. Fabric packings distributed by the company Sulzer have designations BX or CY and relate to packings made of folded or undulating sheets of fabric layers. Occasionally, additional perforations are punched in the fabric layers. These types of fabric packings have sufficient separation capacity and low specific pressure loss. Fabric packings are predominantly used for separation under a high vacuum and slight liquid load, like e.g. during distillation of volatile oils, fatty acids, or fatty alcohols, because the fabric packings utilize the capillary effect to sufficiently wet the surface with the used materials. Fabric packings are, however, generally unsuitable when great liquid load is involved. As a consequence of the construction of such fabric packings and the involved liquid guidance, the gas load of the packings is limited, and excessive gas load causes flooding of the packing and thus malfunction of the mass transfer apparatus. This is also referred to as capacity of the packing. A measure for the capacity of a packing is the F-factor which is based on gas velocity in the apparatus and the root of the gas density.

Commercially available fabric packings flood in dependence on geometric data and process conditions, like, e.g., pressure in the apparatus, at F-factors of 1.5 to 2.5 $Pa^{0.5}$.

U.S. Pat. No. 5,607,743, issued Mar. 4, 1997, discloses a metallized three-dimensionally deformed gauze which can be used as packing material for columns, catalysts and catalyst supports. The open meshes of the filigree-type network structure of the electrically conductive gauze are formed from the meshes, extended by deep drawing, of a woven fabric or of a knitted fabric, e.g. of a cross-laid fabric fixed by means of extensible filling threads, of a split-knitted fabric, of a woven fabric or, in particular, of a knitted fabric. The gauze has a base which is provided with a large number of uniformly arranged elevations and depressions in the shape of steps with a round or angular base area. The elevations have a flat plateau at the top and the depressions have a flat bottom to enable a good adhesion between the core material and the applied facings.

European Pat. Appl. No. EP 1 033 168 A1 describes a packing of wire mesh, providing a mass transfer between individual layers of the packing. The layers are interconnected to enable a mass transfer between the layers. This type of fabric packing is relatively complex and complicated to manufacture.

European Pat. Appl. No. EP 0 416 649 A2 describes oriented column packings, using stacked layers, with each layer consisting of vertical walls of yielding, non-metallic, capillary-active material which is reinforced by a braided armoring of rigid material. The walls are shaped as corrugations oriented obliquely to the vertical. This column packing has shortcomings as result of the requirement for providing an additional braided armoring so as to ensure enough stability of the arrangement, because installation of a braided armoring is difficult to implement.

Japanese Publ. No. JP 09 177725 A describes a packing layer having contact plates provided on both sides with projecting parts, with the whole plate having a undulating configuration in both spatial directions. This construction has shortcomings because depending on the wave length the number of wave valleys and wave crests, and the number of projecting parts is fairly high, when a larger fabric packing is involved. Also the number of contact points between two fabric layers becomes very high. In the event, certain applications require a smallest possible mass transfer between fabric layers, the multiplicity of contact points renders this approach unsuitable.

German Offenlegungsschrift DE 32 22 892 A2 discloses a packing for an exchange column, including metal sheets which are disposed in parallel relationship and touch each other in some places and which are provided on at least one side with a plurality of projections and/or indentations. Their height or depth, respectively, is in the order of magnitude of a millimeter and the spacing therebetween is about in the same order of magnitude. These types of sheets have a surface area which is smaller than a tightly meshed fabric so that these packings have oftentimes an inadequate F-factor.

It would therefore be desirable and advantageous to provide an improved packing which obviates prior art shortcomings and which has an increased capacity, without encountering a loss in the separation capacity or increase in pressure loss.

SUMMARY OF THE INVENTION

According to one aspect of the present invention, a fabric packing includes a plurality fabric layers made of a filament of metal or plastic and having bulges for maintaining the fabric layers at a distance, with the bulges including first protuberances having a generally trough-shaped configuration and second protuberances formed on the first protuberances, thereby defining respective apexes, with the second protuberance sized smaller than the first protuberances, wherein neighboring fabric layers are supported on one another via the second protuberances.

The individual fabric layers are arranged in parallel and may be made of metal or plastic. Also conceivable is the use of flat materials such as sintered metal fibers.

According to another feature of the present invention, the fabric layers may be made of wires having a diameter from 0.05 to 1 mm, preferably 0.08 to 0.25 mm. The wire cloth may be made of a single wire, i.e. monofilament, or of several wires or fibers, i.e. multifilament strands. Currently preferred is a mesh width, i.e. the distance between neighboring parallel wires of the fabric layers, of less than 5 mm, especially less than 1 mm. Examples of weave patterns includes especially the three basic weave patterns, i.e. linen weave, twill weave, and atlas weave, but also plain dutch weave with or without changeover as well as variations of weave patterns. The surface of the fabric layers can be configured finely or coarsely through respective selection of fabric material as well as selection of wires, fibers, mesh width, and weave pattern.

The fabric layers are kept spaced apart at a defined distance by the bulges. Therefore, the bulges are also referred to as "spacer bulges". The first protuberances of the bulges have hereby a trough-shaped configuration, i.e. depressions are formed outwards from the plane of the fabric layers. The distance between the fabric layers and thus the depth of the bulges may range from 1 to 100 mm, preferably 1 to 50 mm. Currently preferred is a depth of 1 to 20 mm. The bulges maintain a precise and constant distance between the fabric layers. The spacing between the bulges may range from 10 to 100 mm, preferably 30 to 50 mm. Bulges of neighboring fabric layers may be disposed in offset relationship.

The provision of the smaller-sized second protuberances on the first protuberances enables a decrease in the contact surface between neighboring fabric layers. As a result, a cross transfer of liquid upon the individual fabric layers can be decreased. The second protuberances may have a diameter of 1 to 10 mm, preferably 1 to 3 mm.

According to another feature of the present invention, the fabric layers have a warp and a weft, with compressed zones being formed in the warp and/or weft in an area of the apexes. The warp density and/or the weft density, i.e. the number of warp filaments and/or weft filaments per unit of measure is not constant in this case but rather has deviations, resulting in the desired compressed regions. Warp and/or weft may be multifilament strands. Wires or pins may be used, preferably at a right angle to the fabric layers, for interconnecting the fabric layers.

According to another feature of the present invention, the fabric layers may have a third kind of protuberances of a height smaller than a height of the first protuberances. The third protuberances differ from the bulges by the absence of any contact to a neighboring fabric layer and are provided to modify the surface of the fabric layers of the fabric packing. The provision of the third protuberances allows a change in the specific surface of the fabric layers of the fabric packing, on one hand, and the establishment of a desired flow guidance of the liquid phase on the fabric layers of the fabric packing and the vapor phase along the fabric layers. This kind of protuberance is thus also referred to as "steering protuberance". Depending on the application involved, one or more steering protuberances may be provided. The steering protuberances may be spaced apart from one another at a distance from 2 to 90 mm, preferably 2 to 20 mm.

The first, second and third protuberances are pressed into the fabric layers of the fabric packing by stamping tools or press tools. In this way, geometries of the protuberances can be configured in many ways. Examples include hemispherical configuration, pyramidal configuration, cylindrical configuration, or block-shaped configuration. Also conceivable are bell-shaped or rod-shaped protuberances. The dimensions of the protuberances can depend on the selected geometry of the protuberances. Protuberances with round base, like, e.g., hemispheres, cylinders or bells, may be described by the diameter of the base. These diameters may range from 2 to 60 mm, preferably 2 to 10 mm. Geometries with cornered base, like, e.g., pyramids or blocks, can be defined along the edge length of the base. The edge lengths of such protuberances may range from 2 to 60 mm, preferably 2 to 10 mm. The depth of the bulges is governed by the distance of the fabric layers from one another. The steering protuberances have a smaller depth than the bulges and do not touch the neighboring fabric layer.

The bulges and the steering protuberances may be pressed out of the fabric layers in alternating relationship.

A fabric packing according to the present invention may be used in a mass transfer apparatus for distillation, rectification, stripping, absorption, and desorption.

At operation, a fabric packing according to the present invention may be used in such a way that the fabric layers are oriented perpendicular, with vapor ascending from the bottom in parallel along the fabric layers. Vapor is steered by the bulges and steering protuberances along the fabric layers and thoroughly mixed. This ensures that a steady exchange of vapor takes place on the surface of the fabric layer at the interface between liquid and vapor so that the presence of a driving concentration gradient between the phases is ensured and a good mass transfer is realized at all times.

According to another aspect of the present invention, a mass transfer apparatus includes a fabric packing according to the invention, a liquid distributor disposed above the fabric packing for distributing a liquid onto the fabric packing, and a liquid collector for disposed below the fabric packing for collecting liquid exiting the fabric packing. The provision of the liquid distributor ensures an even wetting of the fabric layers with liquid. Liquid flows downwards in the form of a film along the fabric layers of the fabric packing and is able to intimately contact the ascending vapor phase. As a result, a good mass transfer between both phases is attained. The liquid distributor can be configured in such a manner that all fabric layers of the fabric packing can be evenly supplied and wetted with liquid at several places. This can be realized by using feeder channels with lateral openings in the form of e.g. bores and slots, through which liquid can exit. The fabric packing is mounted to the feeder channels of the liquid distributor, e.g. by soldering or welding the fabric layers of the fabric packing. The fabric layers are hereby secured to the feeder channel such as to enable the liquid to flow out of the distributor through the openings and to spread evenly across the attached fabric layer of the fabric packing.

The liquid collector underneath the fabric packing is suitably configured to receive liquid from each single fabric layer. An example of a suitable liquid collector includes a collecting channel in which the individual fabric layers converge.

The combination of a fabric packing according to the invention with a liquid distributor and liquid collector results in a unitary structure that can be placed in a mass transfer apparatus and achieves a very effective mass transfer between the liquid and vapor phases. The use of fabric layers ensures little pressure drop and the capacity of the fabric packing is enhanced as a result of the combination with the liquid distributor and liquid collector.

The geometry and packing material of the fabric packing according to the present invention is determined by the task at hand with respect to mass transfer. Metal packings are especially useful when separation of organic material mixtures is involved because organic material is especially capable to wet the fabric layers. Another important aspect in connection with the selection of the material for the fabric packing is the temperature inside the mass transfer apparatus and, e.g., the corrosion behavior of organic media. Low temperatures, e.g. in an absorption process, permit the use of plastic packings. High temperatures, e.g. in a distillation process, require the use of a fabric packing of metal or plastic filaments with a metallic or ceramic coating, e.g. when used in a reactive distillation.

The individual fabric layers of a fabric packing are kept at a mutual distance from one another by the bulges, whereby the integrity of the fabric packing is maintained by connectors, such as wires or pins, extending through the fabric layers. These connectors are suitably disposed in an edge region of a fabric packing. It is however also conceivable to join together neighboring fabric layers through a material union, such as welding, or through a form-fitting engagement, such as shaping of respective zones, in particular the edge region of the fabric layers. Combinations of different connection techniques are also possible.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
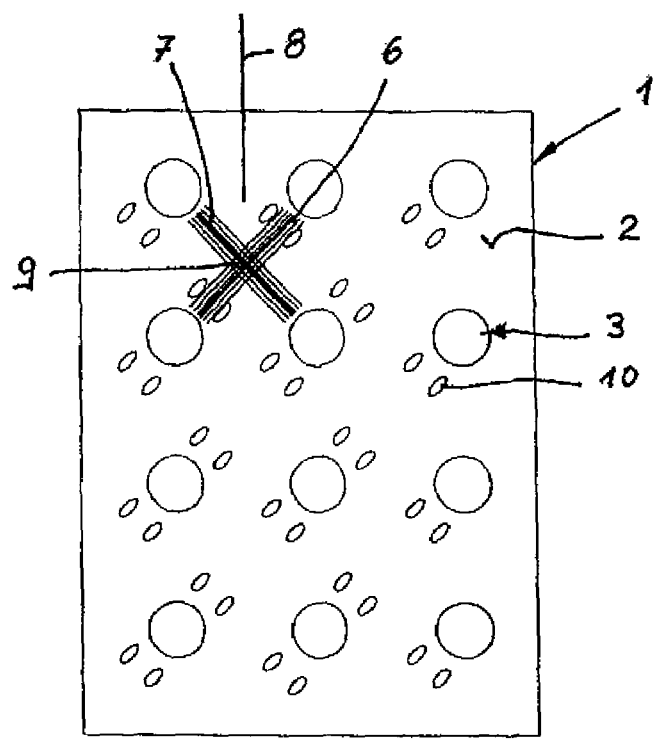
FIG. 1 is a plan view of a detail of a one embodiment of a single fabric layer of a fabric packing according to the present invention.

Throughout all the Figures, same or corresponding elements are generally indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Figure 2:
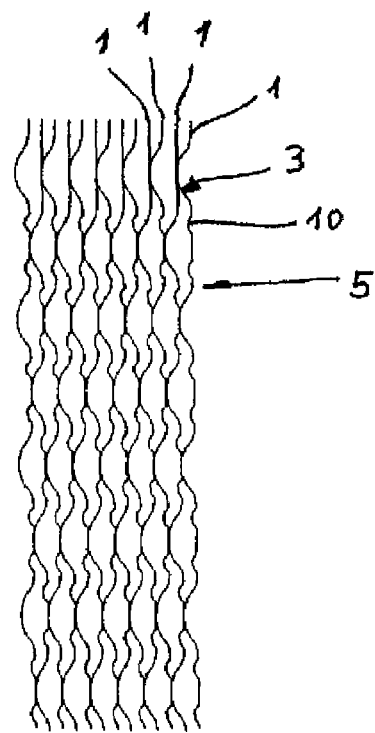
FIG. 2 is a schematic illustration of a fabric packing composed of fabric layers of FIG. 1.

Turning now to the drawing, and in particular to FIG. 1, there is shown a plan view of a detail of one embodiment of a single fabric layer, generally designated by reference numeral 1 and forming part of a fabric packing 5 according to the present invention, shown by way of a section thereof in FIG. 2 and generally designated by reference numeral 5. The fabric layer 1 is made of a metal or plastic filament. The detail of the fabric layer 1 as shown in FIG. 1 represents only a fraction of a much greater fabric layer, whereby the geometry of the detail shown in FIG. 1 continues across the entire fabric layer 1.

The fabric layer 1 includes a flat-shaped base 2 which is formed with a plurality of bulges 3 that project out of the base 2. The bulges 3, also called "spacer protuberances" are of identical configuration and positioned, by way of example, in evenly spaced-apart rows and columns. The bulges 3 are intended to maintain the flat-shaped bases 2 of neighboring fabric layers 1 in parallel relationship in order to establish the fabric packing 5. The bulges 3 of the fabric layer 1 have all a hemispherical configuration and all jut out to the same side. In order to prevent bulges 3 of neighboring fabric layers 1 from engaging one another, neighboring fabric layers 1 are disposed in offset relationship by half a column width and line width.

The fabric layers 1 are arranged vertically or upright so that liquid can be delivered from atop by an unillustrated liquid distributor onto the fabric packing 5 and evenly wet the individual fabric layers 1. Liquid descends as film along the fabric layers 1 and comes into intimate contact with ascending vapor. Subsequently, a liquid collector (not shown), disposed underneath the fabric packing 5, accumulates exiting liquid.

The fabric layer 1 has a warp 6 and a weft 7 which are interwoven with one another to produce the fabric layer 1. In order to enhance wetting of the surface of the fabric layers 1 of the fabric packing 5, warp 6 and weft 7 extend at an angle to a vertical 8. As shown in FIG. 1, warp 6 and weft 7 extend in relation to the vertical 8 at a 45° angle, respectively.

FIG. 1 further shows the presence of compressed regions 9 in the fabric layer 1. The compressed regions 9 are realized by different distances between neighboring filaments of the warp 6 and/or weft 7. The compressed regions 9 are provided in particular in those areas of the fabric layer I which are exposed to greater loads. In other words, the compressed regions 9 are provided especially in those areas which are contacted by the bulges 3. In the non-limiting example of FIG. 2, the apex of each bulge 3 as well as those areas where a bulge 3 contacts a neighboring fabric layer 1 is configured as compressed regions 9.

FIGS. 1 and 2 further show the presence of rows of evenly arranged protuberances 10 which are of comparably smaller size than the bulges 3 and called "steering protuberances". By way of example, the protuberances 10 have an elliptic base and are provided to steer the liquid flow in a certain direction, in the present case in parallel relationship to the warp filaments 6. The protuberances 10 are of significantly smaller height than the bulges 3, as shown in FIG. 2, so that neighboring fabric layers 1 are held against one another exclusively by the bulges 3.

Figure 3:
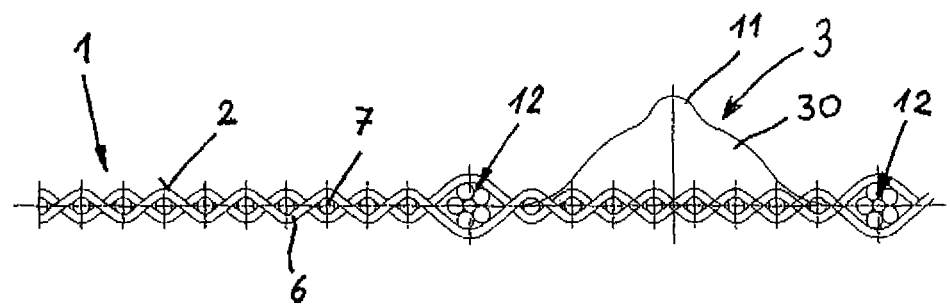
FIG. 3 is a cross section of the fabric layer of FIG. 1.

Turning now to FIG. 3, there is shown a cross section of a portion of the fabric layer 1, depicting the presence of a bulge 3. As shown in FIG. 3, the bulge 3 includes a first protuberance 30 having generally trough-shaped configuration, with the apex of the protuberance 30 being extended by a further protuberance 11 of comparably smaller size by which neighboring fabric layers 1 are mutually supported. The protuberance 30 has a substantially hemispherical cross section, with transitions to the protuberance 11 being rounded so as to establish a virtually bell curve shaped cross section of the bulge 3 jutting out from the flat-shaped base 2 of the fabric layer 1. The fabric layer 1 is provided with several so-called liquid guide filaments which extend preferably between the steering protuberances 10, shown in FIGS. 1 and 2. In contrast to the warp filaments 6 and weft filaments 7, the liquid guide filaments 12 are configured as multifilament strands so that the liquid guide filaments 12 have overall a greater thickness than the weft filaments 7 in the remaining regions of the illustrated fabric layer 1. In this way, the flow of liquid along the fabric layer 1 can be controlled to a certain extent.

Figure 4:
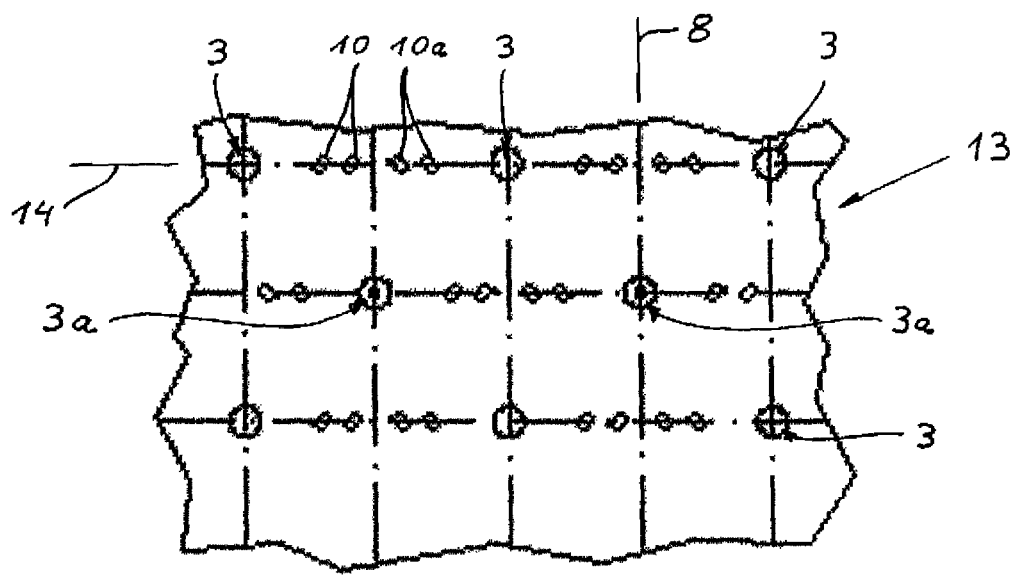
FIG. 4 is a plan view of a detail of another embodiment of a single fabric layer of a fabric packing according to the present invention.

Referring now to FIG. 4, there is shown a plan view of a detail of another embodiment of a single fabric layer, generally designated by reference numeral 13 and forming part of a fabric packing according to the present invention. Parts corresponding with those in FIG. 1 are denoted by identical reference numerals and not explained again. The description below will center on the differences between the embodiments. In this embodiment, provision is made for an alternating arrangement of bulges 3 and bulges 3a, whereby the bulges 3a extend out of the drawing plane, whereas the bulges 3 extend into the drawing plane. The bulges 3, 3a are disposed in even spaced-apart relationship in horizontal rows and vertical columns, depicted by dash-dot lines respectively. The projection direction of the bulges 3, 3a alternates hereby from line to line and column to column.

In contrast to the embodiment of FIG. 1, the fabric layer 13 has steering protuberances 10a in addition to the steering protuberances 10, whereby the steering protuberances 10, 10a are not all oriented in a same direction. As shown in FIG. 4, two protuberances 10 are aligned in each line by −45° in relation to the vertical 8, whereas two neighboring protuberances 10a are aligned in relation to the vertical by +45°. Moreover, the protuberances 10, 10a are disposed, by way of example directly, on the horizontal line 14 between two bulges 3 and likewise between two neighboring bulges 3a.

Figure 5:
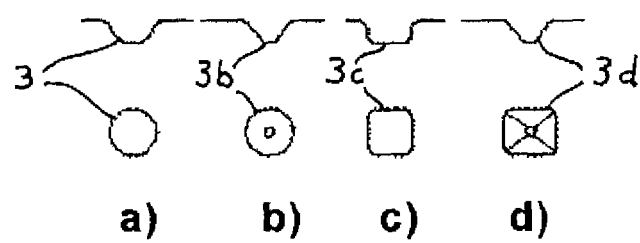
FIGS. 5a-5d show by way of a cross sectional and plan views various configurations of a bulge.

FIG. 5 illustrates different variations of bulges, with FIG. 5a showing the bulge 3 of FIGS. 1, 2 and 4. The bulge 3 has the shape of a spherical surface or a spherical cap. FIG. 5b shows a bulge 3b in the form of a truncated cone, with the tip of the cone being flattened to prevent damage to the wire cloth during a shaping operation.

Bulge 3c of FIG. 5c has a rectangular configuration and thus exhibits a greater contact surface towards the neighboring fabric layer compared to the afore-mentioned bulges 3a, 3b. Bulge 3d of FIG. 5d has the shape of a truncated pyramid. Like the bulge 3b, also the tip of the bulge 3d is flattened to simplify the shaping operation.

All configurations of the bulges 3, 3a, 3b, 3c, 3d can easily and cost-effectively be made by using respective shaping tools.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed is:

1. A fabric packing, comprising a plurality of fabric layers made of a filament of metal or plastic and including bulges for maintaining the fabric layers at a distance, said bulges including first protuberances having a generally trough-shaped configuration and second protuberances formed on the first protuberances, thereby defining respective apexes, with the second protuberance sized smaller than the first protuberances, wherein neighboring fabric layers are supported on one another via the second protuberances.

2. The fabric packing of claim 1, wherein the fabric layers are made of wires having a diameter from 0.05 to 1 mm.

3. The fabric packing of claim 1, wherein the fabric layers are made of wires having a diameter of 0.08 to 0.25 mm.

4. The fabric packing of claim 1, wherein the bulges have a depth in the range from 1 to 100 mm.

5. The fabric packing of claim 1, wherein the bulges have a depth in the range from 1 to 50 mm.

6. The fabric packing of claim 1, wherein the bulges have a depth in the range from 1 to 20 mm.

7. The fabric packing of claim 1, wherein the bulges are spaced from one another by a distance in the range of 10 to 100 mm.

8. The fabric packing of claim 1, wherein the bulges are spaced from one another by a distance in the range of 30 to 50 mm.

9. The fabric packing of claim 1, wherein the bulges are disposed in offset relationship.

10. The fabric packing of claim 1, wherein the second protuberances are defined by a diameter of 1 to 10 mm.

11. The fabric packing of claim 1, wherein the second protuberances are defined by a diameter of 1 to 3 mm.

12. The fabric packing of claim 1, wherein the first protuberances have a bell curve shaped cross section.

13. The fabric packing of claim 1, wherein the first protuberances have a hemispherical configuration.

14. The fabric packing of claim 1, wherein the first protuberances have a pyramidal configuration.

15. The fabric packing of claim 1, wherein the first protuberances are configured in the form of cylinders.

16. The fabric packing of claim 1, wherein the first protuberances are configured in the form of blocks.

17. The fabric packing of claim 1, wherein the first protuberances have a rod-shaped configuration.

18. The fabric packing of claim 1, wherein the fabric layers have a warp and a weft, with compressed zones being formed in at least one member selected from the group consisting of warp and weft in an area of the apexes.

19. The fabric packing of claim 18, wherein the member is made of multifilament strands.

20. The fabric packing of claim 19, wherein the member has a mesh width of less than 5 mm.

21. The fabric packing of claim 19, wherein the member has a mesh width of less than 1 mm.

22. The fabric packing of claim 18, wherein the fabric layers extend in a vertical direction, with warp and weft extending at an angle to the vertical direction.

23. The fabric packing of claim 1, wherein the fabric layers have third protuberances of a height smaller than a height of the first protuberances.

24. The fabric packing of claim 23, wherein the third protuberances extend out of the fabric layers in alternating directions.

25. The fabric packing of claim 23, wherein the third protuberances are spaced apart from one another at a distance from 2 to 90 mm.

26. The fabric packing of claim 23, wherein the third protuberances are spaced apart from one another at a distance from 2 to 20 mm.

27. The fabric packing of claim 18, wherein the member has interlaced therein plural liquid guide filaments defined by a thickness which is greater than a thickness of the remaining filaments of the fabric layers.

28. The fabric packing of claim 27, wherein the fabric layers have third protuberances of a height smaller than a height of the first protuberances, said liquid guide filaments extending between the second protuberances.

29. The fabric packing of claim 27, wherein the liquid guide filaments are composed of several multifilament strands.

30. The fabric packing of claim 1, wherein the filament has a surface provided with a metallic or ceramic coating.

31. The fabric packing of claim 1 for use in a method of carrying out a chemical reaction or thermal material separation in a mass transfer apparatus.

32. A mass transfer apparatus, comprising:

a fabric packing including a plurality of fabric layers made of a filament of metal or plastic and having bulges for maintaining the fabric layers at a distance, said bulges including first protuberances having a generally trough-shaped configuration and second protuberances formed on the first protuberances, thereby defining respective apexes, with the second protuberance sized smaller than the first protuberances, wherein neighboring fabric layers are supported on one another via the second protuberances;

a liquid distributor disposed above the fabric packing for distributing a liquid onto the fabric packing; and a liquid collector disposed below the fabric packing for collecting liquid exiting the fabric packing.

33. The mass transfer apparatus of claim 32, wherein the fabric packing is disposed in a vertical direction.

34. The mass transfer apparatus of claim 32, wherein the fabric packing is constructed for executing thermal mass separation.

35. The mass transfer apparatus of claim 32, further comprising fastening means for maintaining integrity of the fabric packing, said fastening means including wires or pins extending through the fabric layers in an edge region of the fabric packing.

* * * * *

UNITED STATES PATENT AND TRADEMARK OFFICE
CERTIFICATE OF CORRECTION

| | | |
|---|---|---|
| PATENT NO. | : 7,931,255 B2 | |
| APPLICATION NO. | : 11/685613 | |
| DATED | : April 26, 2011 | |
| INVENTOR(S) | : Rüdiger Tüshaus et al. | |

It is certified that error appears in the above-identified patent and that said Letters Patent is hereby corrected as shown below:

Column 7, after line 46, add -- What is claimed as new and desired to be protected by Letters Patent is set forth in the appended claims and includes equivalents of the elements recited therein:

CLAIMS --

Signed and Sealed this
Ninth Day of August, 2011

David J. Kappos
*Director of the United States Patent and Trademark Office*